(12) United States Patent
Hudson et al.

(10) Patent No.: US 12,061,017 B2
(45) Date of Patent: *Aug. 13, 2024

(54) MULTI-PIECE TRUSS LEGS AND RELATED COUPLERS

(71) Applicant: Ojjo, Inc., San Rafael, CA (US)

(72) Inventors: Tyrus Hudson, Petaluma, CA (US); Johann Karkheck, Petaluma, CA (US); Charles Almy, Berkeley, CA (US); Jack West, San Rafael, CA (US)

(73) Assignee: Ojjo, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 17/983,347

(22) Filed: Nov. 8, 2022

(65) Prior Publication Data

US 2023/0054140 A1 Feb. 23, 2023

Related U.S. Application Data

(60) Continuation of application No. 17/064,362, filed on Oct. 6, 2020, now Pat. No. 11,519,637, which is a
(Continued)

(51) Int. Cl.
*F24S 25/00* (2018.01)
*F24S 25/13* (2018.01)
*F24S 30/425* (2018.01)
*F24S 50/20* (2018.01)
*H02S 20/10* (2014.01)
*H02S 20/32* (2014.01)

(52) U.S. Cl.
CPC .............. *F24S 25/13* (2018.05); *F24S 30/425* (2018.05); *F24S 50/20* (2018.05); *H02S 20/10* (2014.12); *H02S 20/32* (2014.12)

(58) Field of Classification Search
CPC ....... F16B 2/12; F16B 9/023; F24S 2025/802; F24S 25/70; F24S 25/12; F24S 25/632; F24S 25/20; F24S 25/636; F24S 25/65; F24S 25/13; F24S 30/425; F24S 50/20; H02S 20/24; H02S 20/10; H02S 20/32; H01L 31/042; Y10T 24/44043; Y02B 10/20; Y02B 10/12; Y02E 10/47
USPC .......... 52/173.3; 136/244; 126/600; 248/237
See application file for complete search history.

(56) References Cited

U.S. PATENT DOCUMENTS 6,485,180 B2 * 11/2002 Mena ....................... F16C 33/20
384/38
7,220,056 B2 * 5/2007 Kubota ................... F16C 33/20
384/220

(Continued)

*Primary Examiner* — Chi Q Nguyen
(74) *Attorney, Agent, or Firm* — Phillip D. Mancini

(57) ABSTRACT

A two-piece truss leg system for an A-frame-shaped truss foundation system for single-axis trackers. A driving coupler at the head of each screw anchor used to drive the component into the ground as well as to join the upper leg component to the screw anchor. A connecting portion of the coupler extending above a main body of the coupler is received within an open end of an upper leg component. A curved outer surface of the connecting portion enables the upper leg component to be angularly adjusted relative to the screw anchor. A channel in the connecting portions enables the upper leg component to be deformed into the channel with a crimp connecting.

16 Claims, 17 Drawing Sheets

Related U.S. Application Data division of application No. 16/422,698, filed on May 24, 2019, now Pat. No. 10,837,677.

(60) Provisional application No. 62/801,604, filed on Feb. 5, 2019, provisional application No. 62/745,188, filed on Oct. 12, 2018, provisional application No. 62/727,456, filed on Sep. 5, 2018.

(56) References Cited

U.S. PATENT DOCUMENTS

| | | | | |
|---|---|---|---|---|
| 7,401,789 | B2* | 7/2008 | Harer | F16J 15/3216 |
| | | | | 180/428 |
| 8,413,391 | B2* | 4/2013 | Seery | F24S 25/70 |
| | | | | 52/173.3 |
| 9,017,007 | B2* | 4/2015 | Therkildsen | B65G 57/245 |
| | | | | 414/754 |
| 9,207,000 | B2* | 12/2015 | Kruse | F24S 30/425 |
| 9,568,044 | B2* | 2/2017 | Kang | F16H 57/0006 |
| 9,933,014 | B2* | 4/2018 | Ikeda | B62D 3/12 |
| 9,995,337 | B2* | 6/2018 | Ikeda | F16C 35/02 |
| 11,519,637 | B2* | 12/2022 | Hudson | F24S 50/20 |
| 11,536,001 | B2* | 12/2022 | Hudson | F24S 25/12 |
| 11,548,546 | B2* | 1/2023 | Sekine | F16C 29/02 |
| 11,713,784 | B1* | 8/2023 | Gurvich | F16C 17/18 |
| | | | | 384/138 |
| 2019/0368548 | A1* | 12/2019 | Lundsted Poulsen | |
| | | | | F04D 29/669 |
| 2021/0140471 | A1* | 5/2021 | Son | F16C 27/02 |

* cited by examiner

MULTI-PIECE TRUSS LEGS AND RELATED COUPLERS

CROSS REFERENCE TO RELATED APPLICATIONS

This is a continuation of U.S. utility patent application Ser. No. 17/064,362 filed on Oct. 6, 2020, now issued U.S. Pat. No. 11,519,637, which, is divisional of utility patent application Ser. No. 16/422,698, titled, "Multi-piece truss legs and related couplers," filed on May 24, 2019, now issued U.S. Pat. No. 10,837,677 which, claims priority to U.S. Provisional Patent Application No. 62/727,456, titled, "Foundation piers for axial solar arrays and related systems and methods," filed on Sep. 5, 2018, U.S. Provisional Patent Application no. 62/745,188, titled "Optimized A-frame foundations for axial solar arrays and related systems and methods," filed on Oct. 12, 2018, and U.S. Provisional Patent Application No. 62/801,604, titled, "Articulating pile couplers and related systems and methods," filed on Feb. 5, 2019, the disclosures of which are hereby incorporated by reference in their entirety.

BACKGROUND

Until recently, single-axis solar trackers have been built predominately on monopile foundations. Monopiles consist of individual beams beaten into the ground with a pile driver at regular intervals along an intended North-South axis of the tracker torque tube. The monopile paradigm requires that each beam be over-specified in order to support not only the weight of the tracker system (torque tube, panels, motors and mounting hardware) but also to withstand bending moments introduced by wind striking the array. Because single structural members are relatively poor at resisting bending, much larger beams must be used than that required to support the weight of the tracker system alone. Therefore, monopiles are inherently wasteful relative to foundation systems that don't need to resist bending.

To address this inefficiency, the applicant and inventors of this disclosure have proposed a truss foundation system that uses an A-frame to support the tracker torque tube and bearing assembly. The system is known commercially as EARTH TRUSS. A-frames are advantageous because they translate lateral loads into axial forces of tension and compression rather than bending. Since single structural members are relatively good at resisting lateral loads, smaller foundation components may be used to support single-axis trackers, relative to monopiles, saving steel.

The EARTH TRUSS foundation is constructed by driving a pair of adjacent screw anchors into the ground so that they are angled towards one another. This may be done, for example, with a rotary driver or screw driving machine. The machine may be a purpose-built device or an attachment to an excavator or other piece of general-purpose heavy equipment. Once the adjacent screw anchors are driven to their target depth, upper legs are joined to each screw anchor, and an adapter, bearing adapter or other assembly connects the free ends of each upper leg to complete the truss and to provide support for the tracker components.

Whether A-frames or monopiles are used, adherence to positional tolerances is important to prevent undue stress on the tracker torque tube. A-frames present unique challenges relative to monopiles because two separate piles are driven into the ground in a substantially common East-West plane but at non-plumb angles on either side of the North-South line of the torque tube. Even with machine automation, it is possible that the respective axes of two adjacent piles do not intersect because the piles are driven offset (i.e., out of plane to one another). Alternatively, in some cases they may intersect but at a point below or above the desired intersection height. Just as with monopiles, misalignment of foundation components from their intended axes, may induce strain on the torque tube and even make it impossible to install tracker components. To that end, the focus of this disclosure is on components and systems for correcting for misalignment between foundation components in truss foundations.

DETAILED DESCRIPTION

The following description is intended to convey a thorough understanding of the embodiments described by providing a number of specific embodiments and details involving articulating pile-to-pile interfaces for A-frame foundations. It should be appreciated, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

As discussed in the Background, the inventors and applicant of this disclosure have proposed an alternative to plumb monopile foundations that aims to significantly reduce the total amount of steel required to support single-axis trackers and other axial solar arrays. This alternative foundation system, referred to commercially as EARTHTRUSS™, consists of a pair of sloped legs extend above and below ground and are joined at the apex with an adapter, bearing assembly, or other torque tube support element to form a truss. The truss legs are substantially aligned on either side of the torque tube so and ideally oriented to that an imaginary line through their respective centers of mass intersects at a point in space that overlaps with the tracker's axis of rotation.

The truss architecture offers several advantages over conventional monopiles foundations. First, if properly designed, the A-frame will translate lateral loads into axial forces of tension and compression in the legs rather than bending. The A-frame or truss directs lateral loads along the axis of the legs where it is best applied. Therefore, the size and gauge of the steel that makes up the legs may be much smaller than an equivalent monopile. Also, without needing to resist bending, the legs do not need to be driven as deep as conventional monopiles. This saves steel but also reduces the likelihood of encountering a refusal. A refusal occurs when additional impacts of a pile driver fail to result in additional embedment of the pile. Usually, this is the result of striking rock or cementious soil and requires an expensive, labor-intensive mitigation process. The shallower piles are driven, the less likely it is that they will encounter rock or cementious soil.

Figure 1:
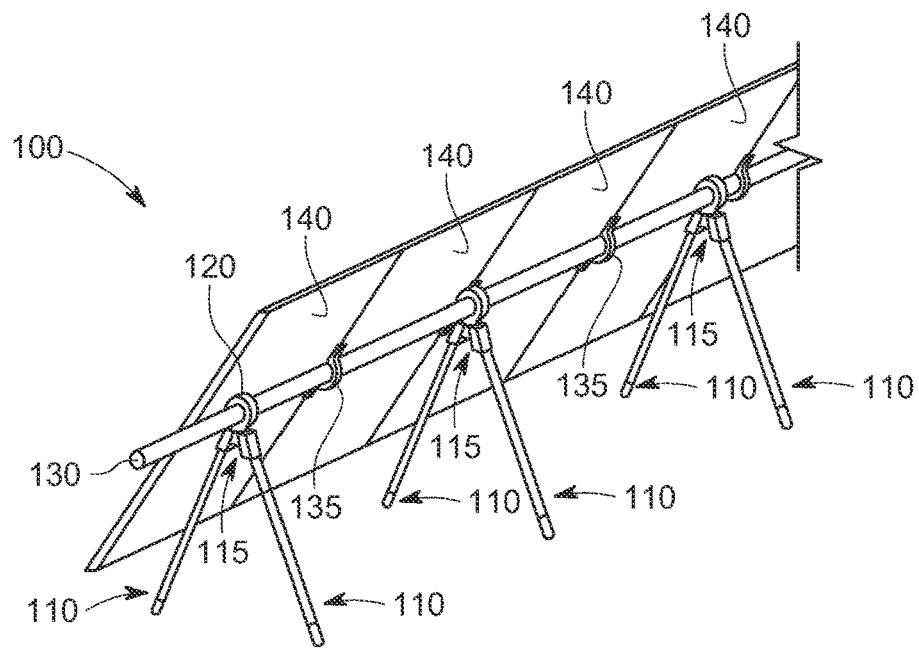
FIG. 1 is perspective view of a portion of a single-axis tracker supported by A-frame-shaped truss foundations according to various embodiments of the invention.

Turning now to FIG. 1, this figure shows a portion of a single-axis tracker supported by several A-frame-shaped truss foundations according to various embodiments of the invention. Each foundation 100 consists of legs 110 extending above and below ground and joined together with adapter 115. Bearing assemblies 120 sit atop each adapter 115 and torque tube 130 passes substantially orthogonally through each bearing assembly, enabling it to rotate about its own axis. Solar panels 140 are attached to torque tube 130 via mounting brackets 135. This exemplary tracker system is a bottom-up design where the torque tube is supported from below by a bearing housing assembly that rests on the adapter. Other tracker systems may employ a top-down design where the torque tube hangs from a bearing pin received in the bearing assembly so that the torque tube can sweep through an arc like a pendulum. In such systems, the drive motor is offset from the torque tube's main axis so that the tracker's axis of rotation. Bearing assemblies are still attached to the head of each pile, but the axis of rotation is offset from the torque tube's main axis. One such top-down tracker system is disclosed, for example, in U.S. Pat. No. 10,222,446, which is hereby incorporated by reference in its entirety. The various embodiments of the invention are compatible with bottom-up as well as top-down or off-set single-axis trackers.

Figure 2A:
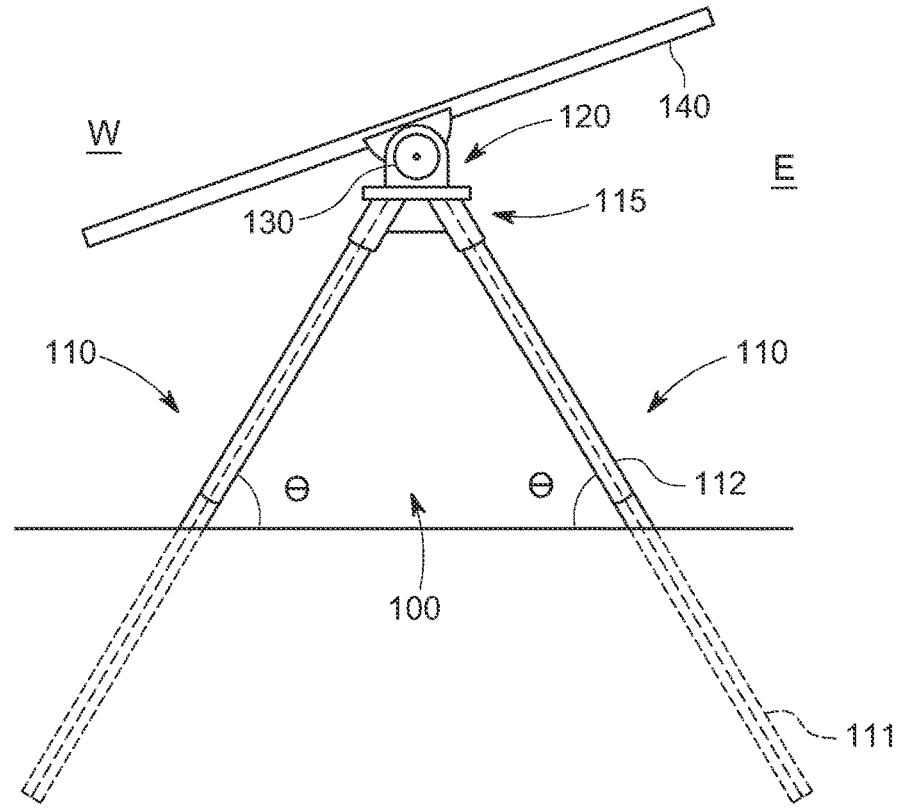
FIG. 2A is an end view of the single-axis tracker shown in FIG. 1.
Figure 2B:
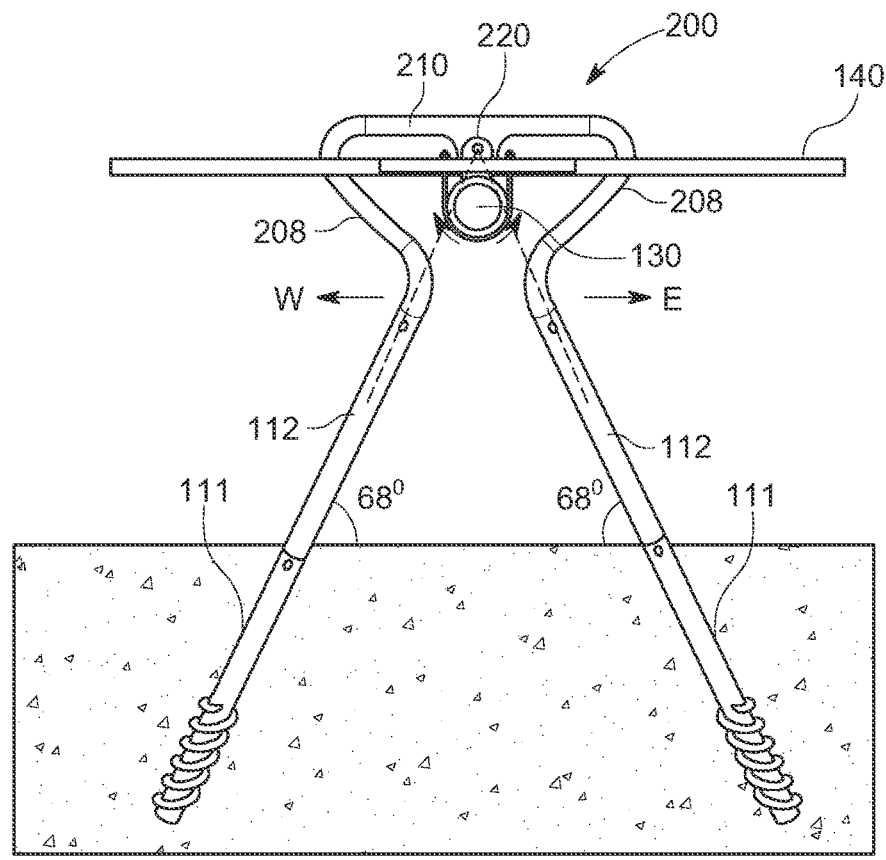
FIG. 2B is an end view of another single-axis tracker supported by an A-frame-shaped truss foundations according to various embodiments of the invention.
Figure 2C:
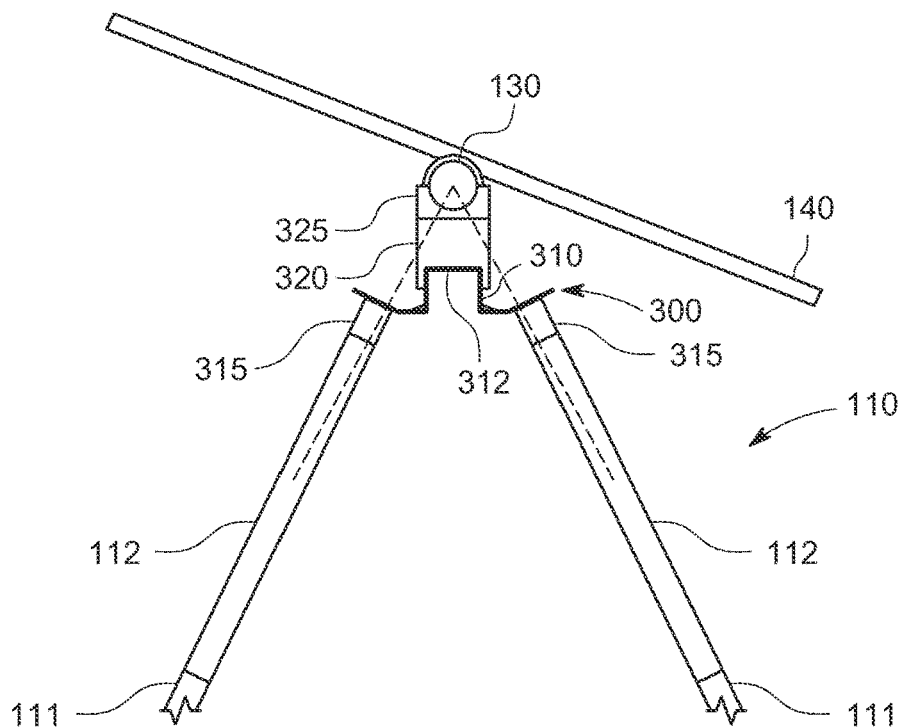
FIG. 2C is an end view of yet another single-axis tracker supported by an A-frame-shaped truss foundations according to various embodiments of the invention.

FIGS. 2A-2C are end views of various tracker systems supported by an A-frame-shaped truss foundation according to the various embodiments of the invention. Starting with 2A, this figure shows and end view of the tracker system of FIG. 1. Each leg 110 consists of screw anchor 111 and upper leg 112. In various embodiments, each screw anchor 111 is driven until only the end extends above-ground so that it can be connected to one of the upper legs. Upper legs 112 are joined by adapter 115 to form a rigid A-frame structure which, in turn supports bearing assembly 120. In various embodiments, screw anchors 111 may be driven at symmetric angles ±Θ to one another (e.g., at ±60-degrees with respect to horizontal). Adapter 115 in this example, has a pair of connecting portions extending down and away from each other at an angle and spacing that match the angle and spacing of legs 110.

Turning to FIG. 2B, this figure shows another single-axis tracker system supported by an A-frame-shaped truss foundation according to various embodiments of the invention. The tracker system shown here is a top-down design where the torque tube drive motor is offset from the main axis of the tube so that the tube swings through an arc rather than rotating about its own axis. As with the system in 2A, tracker 200 is supported by two-piece truss legs 110 consisting of screw anchors 111 and upper legs 112. However, instead of a separate bearing assembly, the system of 2B uses single bearing adapter 200 to perform both functions. Bearing adapter 200 consists of symmetric S-shaped arms 208 interconnected by bridge portion 210. Bearing pin 220 passes through a cylindrical bearing in the approximate middle of bridge portion 210. Hanger clamps suspend torque tube 130 from bearing pin 220. Symmetric S-shaped arms 208 define an opening for torque 130 to swing within as the motor moves tube 130 from an East-facing orientation to a West-facing one.

FIG. 2C shows another bottom-up style single-axis tracker system supported by an A-frame-shaped truss foundation according to various embodiments of the invention. In this system, truss legs 110 are joined by adapter 300. Adapter 300 approximates H-pile flanges with vertical mounting flanges 310 interconnected by bridge portion 312. Flanges 310 terminate into symmetric wings that support connecting portions 315. Pile cap 320 attaches to flanges 310 and bearing assembly 325 sit on pile cap 320. Torque tube 130 rotates about its own axis within bearing 325.

Although they are all different, each of the systems shown in FIGS. 2A-C include truss legs and adapters that orient the legs to substantially point at the rotational axis of the system. This is shown by the dotted lines in the figures extending from the approximate center of mass of each leg to the rotational axis of the system. In 2A, these lines extend to the center of torque tube 130 which is also the center of bearing assembly 115. In 2B, the lines extend to bearing pin 220 in bridge portion 210, and in 2C, they also extend to torque tube 130 at the center of bearing assembly 325.

Figure 3:
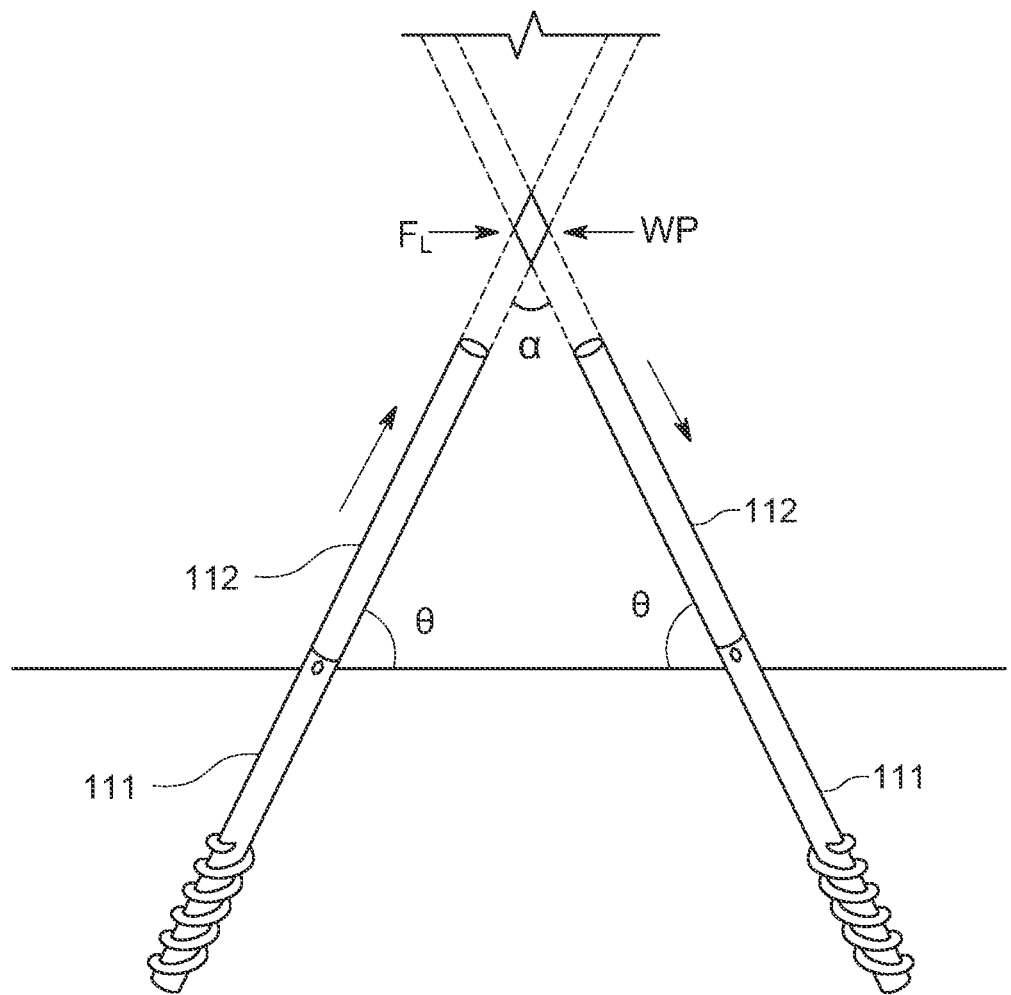
FIG. 3 is an A-frame-shaped truss foundation according to various embodiments of the invention.

Turning to FIG. 3, this figure shows the foundation system used to support the various trackers in FIGS. 2A-C with the adapters and tracker components removed. If the piles are aligned with respect to the torque tube, they will point at a common intersection point labeled "WP" in the figure. This point is referred to herein as the apex or work point of the truss and represents the ideal place to apply lateral loads to prevent the introduction of bending moments. The location of the work point relative to the ground will vary with truss leg angle Θ/top angle α as well as with the spacing between the legs at the point where they are driven into the ground. The steeper the leg angle/smaller the top angle, or further apart the screw anchors are when driven into the ground, the higher the work point will be.

In a single-axis tracker, forces are translated to the foundation via the rotational axis of the system (i.e., the point where rotating parts contact the non-rotating parts rotate about or within). In most single-axis tracker systems, where a torque tube is captured within a circular bearing, the torque tube itself defines the axis of rotation so lateral forces are transferred to the foundation directly via the bearing assembly surrounding the tube. However, as discussed in the context of FIG. 2B, in some trackers, the torque tube is offset from the axis of rotation and instead swings about a bearing pin above the tube. In this type of tracker, the axis of rotation is about the bearing pin rather than the tube. In either case, when supported by a truss foundation, the rotational axis should ideally pass through the work point to prevent the introduction of bending moments in response to lateral loads, which in turn, will require additional reinforcement to resist. Using more metal to construct the legs is antithetical to the goal of reducing steel and negates some of the benefits of a truss relative to monopiles. Because this problem is unique to A-frame foundations, it is not one that tracker makers have needed to design for, however, even those who have proposed A-frame foundations for single-axis trackers in the prior art have failed to recognize the significance of alignment and orientation of the rotational axis with the work point in reducing and ideally eliminating moments.

In order to achieve this, it is important to control the orientation of the truss legs with respect to each other as well as with respect to the intended axis of rotation. When installing screw anchors there are several possible modes of misalignment that could result in the legs not intersecting at the intended axis of rotation. For example, the screw anchors may be aligned in the East-West direction but oriented at different angles with respect to horizontal. In other words, their respective axes do intersect but not at the intended axis of rotation. In other cases, they may be misaligned so that their respective axes don't intersect. In still further cases, they may be aligned and leaning too far North or South so that they intersect at a point below or above the desired work point. Any of these situations could introduce a moment to the foundation and/or make it difficult to attach the torque tube and bearing assembly components.

Figure 4A:
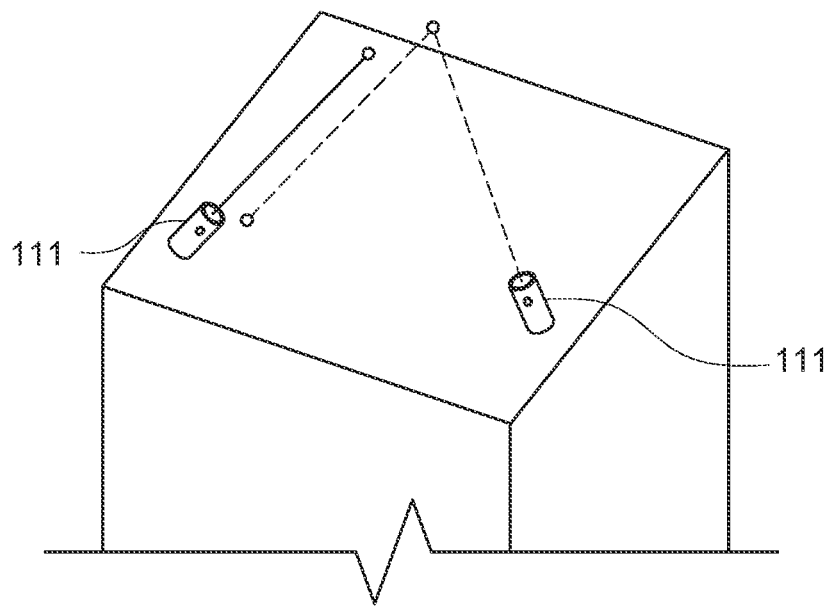
FIGS. 4A and 4B show possible misalignment scenarios with an A-frame foundation according to various embodiments of the invention.
Figure 4B:
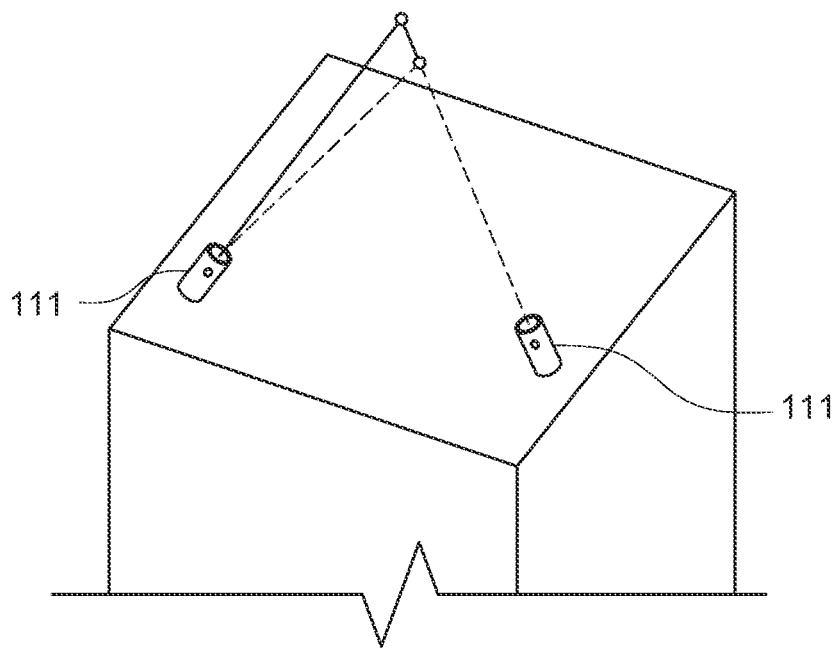

FIGS. 4A and B illustrate two exemplary cases of axial misalignment between screw anchors. In 4A, the actual axis of the left screw anchor is not aligned with the right screw anchor or with respect to the desired rotational axis because the screw anchor was driven at the wrong location. The dotted line extending out of each anchor shows that the left anchor's actual axis is off the ideal and therefore does not intersect the right anchor's axis. In FIG. 4B, the base piles are co-planer, but one has been driven at a steeper angle with respect to horizontal and therefore the point of intersection is above the desired rotational axis.

Figure 5B:
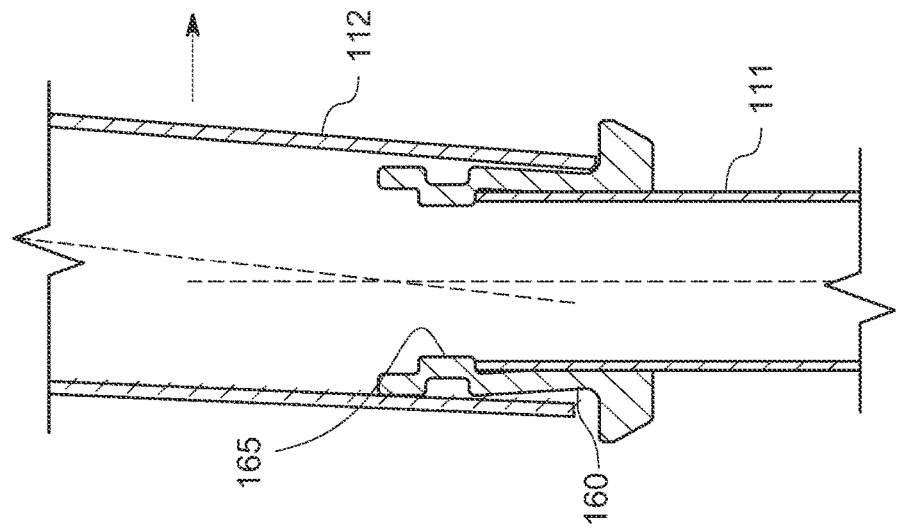
FIGS. 5A and 5B show a coupler for a two-piece truss leg according to various embodiments of the invention.
Figure 5A:
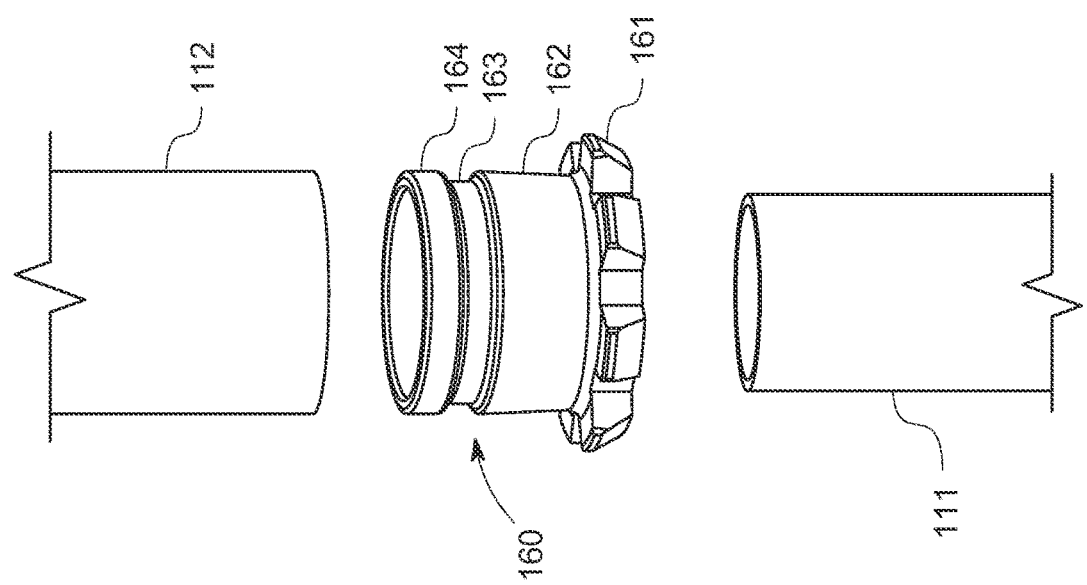

One way to compensate for the possible modes of misalignment shown in FIGS. 4A and B relies on flexibility inherent in two-piece leg paradigm. By building some degree of axial adjustment in the coupling between screw anchors and upper legs, it is possible to redirect the screw anchor's misaligned axis via the upper leg when joining the upper legs to an adapter or to a bearing adapter. To that end, various embodiments of the invention provide couplers for joining upper legs to driven screw anchors that provide some (e.g., 0 to 10-degrees) of multi or omnidirectional axial adjustment. FIGS. 5A-B show one such coupler according to various exemplary embodiments of the invention.

Coupler 160 has a main body portion with a pair of opposing male and female portions top and bottom ends respectively. In the figure, top refers to the portion closest to upper leg 112 and bottom refers to the portion closest to screw anchor 111. Using this reference, the top end of screw anchor 111 is received in a recess in the bottom end of coupler 160. Screw anchor 111 is shown as having a substantially uniform diameter without any modifications to the upper end. In various embodiments, coupler 160 includes internal stop 165 visible in 5B that limits the extent of penetration of screw anchor 111 into the main body of coupler 160. It should be appreciated that in other embodiments the orientation of coupler 160 may be reversed so that upper leg 112 is received within the body of coupler 160.

In various embodiments, one or more spot welds or continuous welds may be used to join coupler 160 to screw anchor 111. In various embodiments, the opening in the bottom of coupler 160 is circumscribed by a ledge 161. In other embodiments, one or more stops may be formed on the outer surface of coupler 160 in place of ledge 161. In the example of FIG. 5A/B, ledge 161 has several driving features (e.g., notches) formed in it that enable a chuck or other driving head of a rotary driver to engage with it while still providing orthogonal surfaces area to limit the extent of penetration into upper leg 112. These notches are exemplary only. In other embodiments, facets may be cut into ledge 161 instead of notches. In still further embodiments, other shapes and/or features may be used. The specific geometry of driving features or stops in ledge 161 is a design choice.

The top portion of coupler 160 above ledge 161 is referred to generally as the connecting portion. This portion consists of a pair of opposing tapered or conical surfaces 162/164 projecting above ledge 161. Moving away from ledge 161, surface 162 increases in outside diameter up to a relative maximum. In this exemplary embodiments, a gap is formed at the relative maximum. Gap 163 is characterized by an outside diameter that is relatively smaller than surface 162 at its maximum diameter. Tapered surface 164 begins on the opposing side of gap 163. Surface 164 begins on the other side of gap 163 at its maximum diameter, decreasing as moving away from gap 163. In various embodiments, gap 163 completely circumscribes coupler 160. In other embodiments, gap 163 may be formed in one or more distinct locations around the circumference of coupler 160. In various embodiments, tapered surfaces 162/164 have slopes that are symmetric about gap 163, even if they are not the same size. It should be appreciated that although tapered or conical surfaces 162/164 are shown as continuous that in various embodiments they may be formed in two or more distinct sections. Also, one or more gaps may be formed within conical surfaces 162/164. Such modifications are within spirit and scope of the various embodiments of the invention.

Figure 10A:
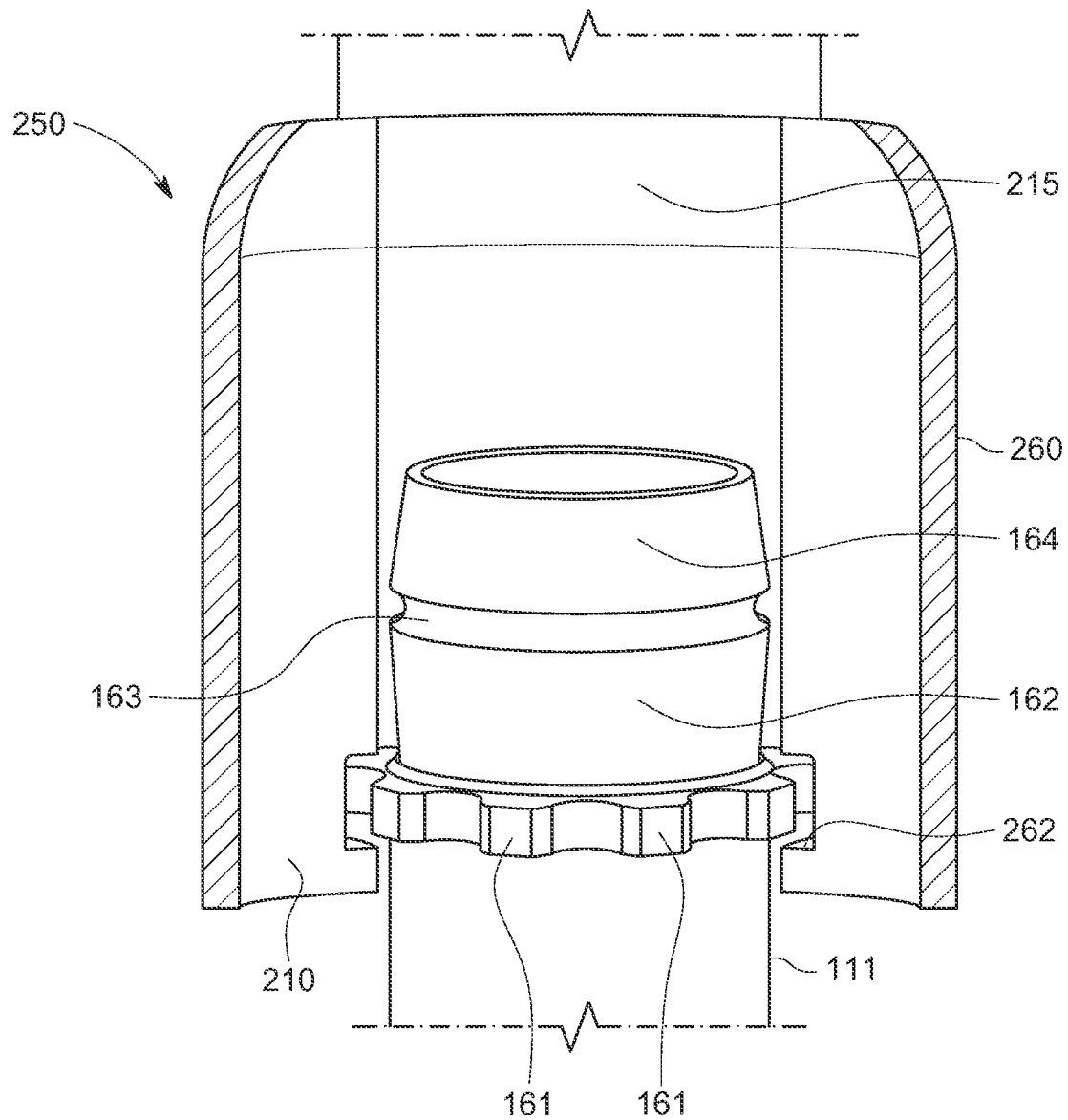
FIGS. 10A-10C show engagement between the driving coupler of an exemplary screw anchor and a rotary driver.
Figure 10B:
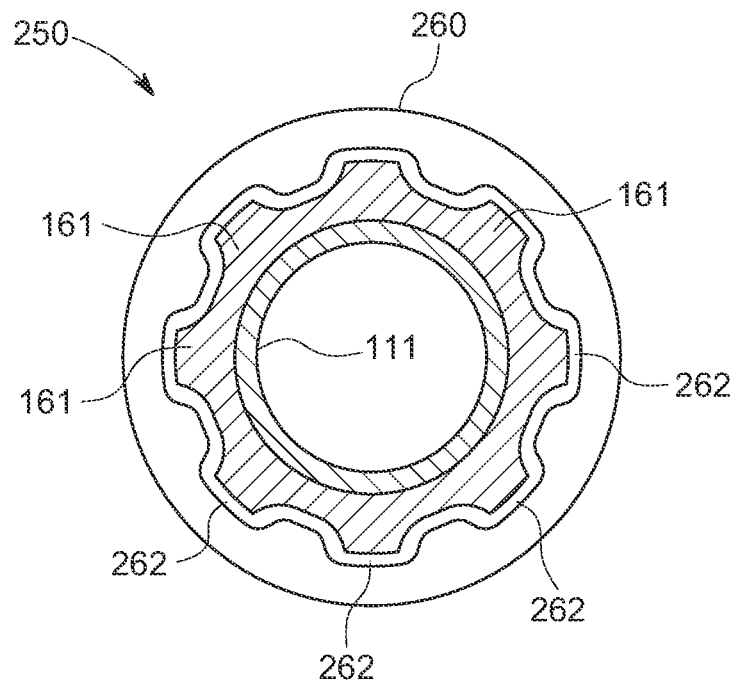
Figure 10C:
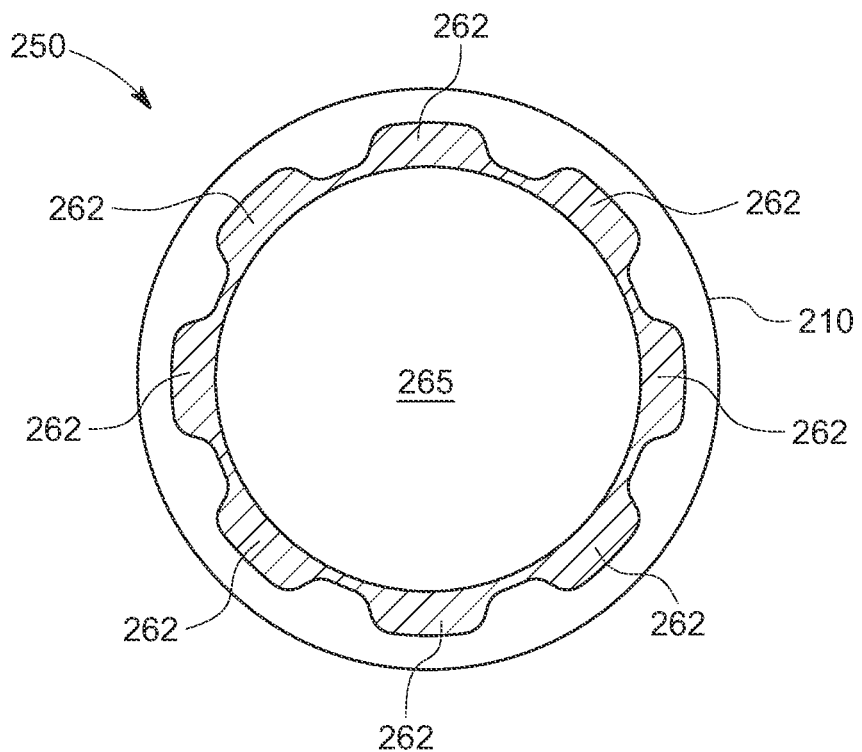

In various embodiments, a machine having a rotary driver is used to install anchor 111. In such embodiments, a rotary driver such as rotary driver 250 shown in FIGS. 10A, 10B and 10C. Rotary driver 250 has a rounded chuck portion 260 with hollow center opening 265. As shown, the underside of chuck 260 has series of recesses 262 that receive teeth 161 of coupler 160. In various embodiments, coupler 160 is inserted into opening 265 until teeth 161 rest against recesses 262. In various embodiments rotation of the rotary driver combined with downforce transfers torque and downforces to the foundation component (screw anchor 111) via coupler 160 to driver it into the ground. FIG. 10A is a partial cutaway view showing coupler 160 seated within chuck 260 of rotary driver 250. The hydraulic motor powering rotary driver 250 has been intentionally omitted from the figures. FIG. 10B provides a cut away view transverse to that of 10A, showing the engagement between teeth 161 of coupler 160 and corresponding recesses 262 in chuck 260 of rotary driver 250. Finally, 10C simply shows chuck 260 of rotary drive 250 looking up into it, that is, from the perspective of coupler 160.

In various embodiments, and as shown in 5B, upper leg 112 may have a slightly larger outside diameter than screw anchor 111. In various embodiments, the connecting portion of coupler 160 is received within the lower end of upper leg 112. Ledge 161 may act as a stop to limit the depth of penetration of coupler 160 within upper leg 112, although as discussed above, one or more bumps, stops or other structures may be used for this purpose. In various embodiments, at their maximum diameter, opposing tapered surfaces 162/164 will be slightly smaller than the inside diameter of upper leg 112 or portion of upper leg 112 that engages with coupler 160. In various embodiments, this will enable upper leg 112 to be sleeved over coupler 160 and pivoted omnidirectionally about ledge 161 to be misaligned with the axis of screw anchor 111 by an angle φ ranging from 0 up to 10-degrees. The maximum extent of the angle φ will be dictated by slope of tapered portions 162/164. As upper leg is pivoted about ledge 161, different portions of the inside surface of upper leg 112 will contact surfaces 162/164. In various embodiments, this may be useful to correct for misalignment of screw anchor 111 with respect to the intended axis of rotation by effectively redirecting the leg axis. Once the desired alignment between upper leg 112 and screw anchor 111 has been achieved, a crimping tool or other device may be used to deform upper leg 112 at one or more locations above a gap in coupler 160. In various embodiments, the void created by gap 163 will provide a place for plastic deformation of upper leg to lock it into place at the desired orientation.

Figure 5C:
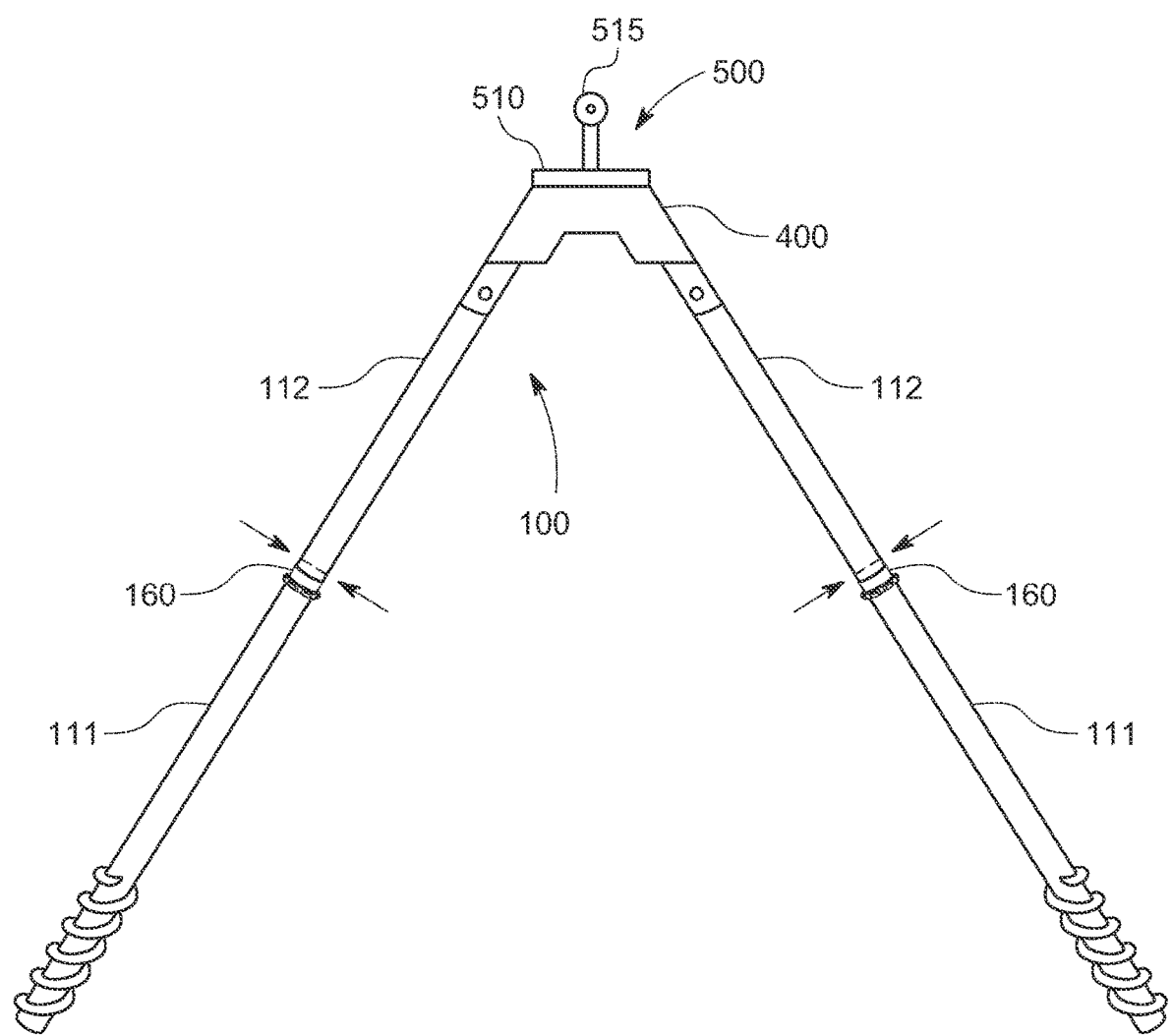
FIG. 5C is an assembled truss foundation according to various embodiments of the invention.

FIG. 5C shows how alignment may be performed in real-world conditions in accordance with various embodiments of the invention. Adjacent screw anchors 111 are driven into support ground at the desired locations on either side of the North-South row where the torque tube will be positioned and angles to one another to enable their respective axes to intersect at the intended axis of rotation. The specific mechanism and means for accomplishing the initial orientation of the machine driving the screw anchors so that are aligned with respect to the intended axis of rotation is intentionally omitted here because it is the subject of other applications. Once screw anchors 111 are driven to the desired or target depth, upper legs 112 may be sleeved over respective couplers 160. In various embodiments, coupler 160 will provide enough resistance to keep upper legs 112 in place. Then, adapter 400 is attached to the opposing end of each upper leg. In various embodiments, a jig or other device, such as jig 500 shown in the figure, may be placed atop adapter 400. Jig 500 may have one or more magnetic portions to enable it to be selectively attached to adapter 400. The jig shown in this exemplary figure has planar portion 510 and laser target 515. In various embodiments, target 515 may be set to approximate the height above adapter 400 of the rotational axis of the intended bearing assembly so that upper legs 112 may be aligned with the rotational axis. In various embodiments, a laser guide may be set on the legs or adapter of the preceding or first installed truss so that subsequent trusses may be aligned to that one. In various embodiments, coupler 160 will allow upper legs 112 to be moved omnidirectionally with respect to coupler 160, as well as vertically so that adapter 400 can be oriented to place target 515 in the path of laser. Once the desired orientation is achieved, a crimping tool or other device may be used to plastically deform upper legs 112 over channel 163 in coupler 160 to preserve the orientation. It should be appreciated that in various other embodiments, jig 500 may also replicate the geometry of the adapter so that upper legs 112 may be correctly oriented before attaching adapter 400. In such cases, once the proper leg alignment has been achieved, and upper legs 112 crimped, jig 500 may be removed, leaving only upper legs 112 extending in free space so that an adapter and bearing assembly, or, alternatively, a bearing adapter may be installed without needing to perform additional laser-based alignment. Micro-adjustments in both the East-West and vertical directions may be made when the bearing assemblies are attached to adapter 400 to account for tolerances in the torque tube itself.

Turning now to FIGS. 6A-D, these figures show another coupling system for a two-piece truss leg that enables the upper portion to axially articulate with respect to the lower one in any direction in accordance with various embodiments of the invention. The system shown in these figures relies on plastic deformation of the extension pile about articulating joint 172 formed in upper leg 112 proximate to where it couples to screw anchor 111.

Figure 6A:
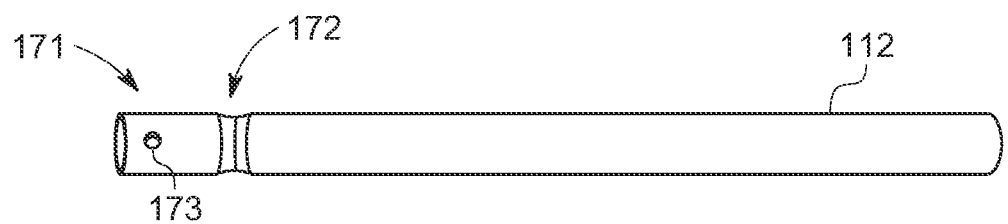
FIGS. 6A-6C are multiple view of a portion of a truss leg according to various embodiments of the invention.

FIG. 6A shows elongated upper leg 112 with articulating joint 172 proximate to lower end 171 that connects to screw anchor 111. In this example, joint 172 is formed by compressing or pinching upper leg 112 around its outer surface to form a circular indentation. In various embodiments, upper leg 112 has a slightly larger diameter than screw anchor 111 so that it can fit over the top of screw anchor 111. In other embodiments, they may be the same diameter, but the upper end of screw anchor 111 may be tapered to allow a portion of upper leg 112 to fit over it. In still further embodiments, lower end 171 of upper leg 112 may be slightly expanded to allow it to fit over the top end of screw anchor 111. In still further embodiments, the end of upper leg 112 may fit inside the top end of screw anchor 111.

In the example shown here, articulating joint 172 is a crimped indentation formed in lower end 171 of upper leg 112. This is a relatively inexpensive method to create an articulating joint relative to other designs. In addition to providing a pre-stress point for bending upper leg 112, joint 172 functions as a stop, limiting the depth of penetration of screw anchor 111 into upper leg 112. In this example, upper leg 112 includes pin holes 173 for receiving retaining pin 174. In various embodiments, retaining pin 174 may be secured with cotter pin 175. Alternatively, a different mechanism may be used to secure retaining pin 174. In various embodiments, the top end of screw anchor 111 may also have a pair of aligned holes that line up with holes 173 when upper leg 112 is sleeved over it.

Figure 6B:
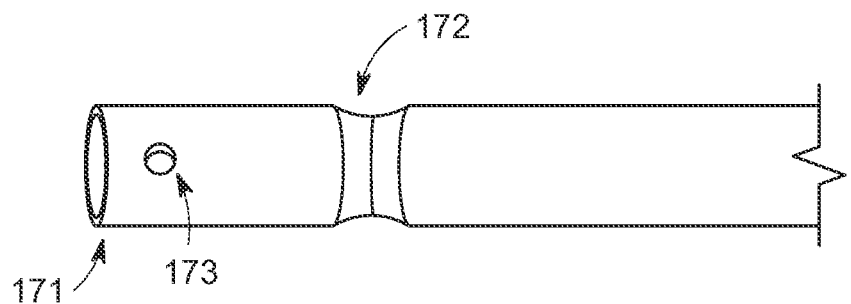
Figure 6C:
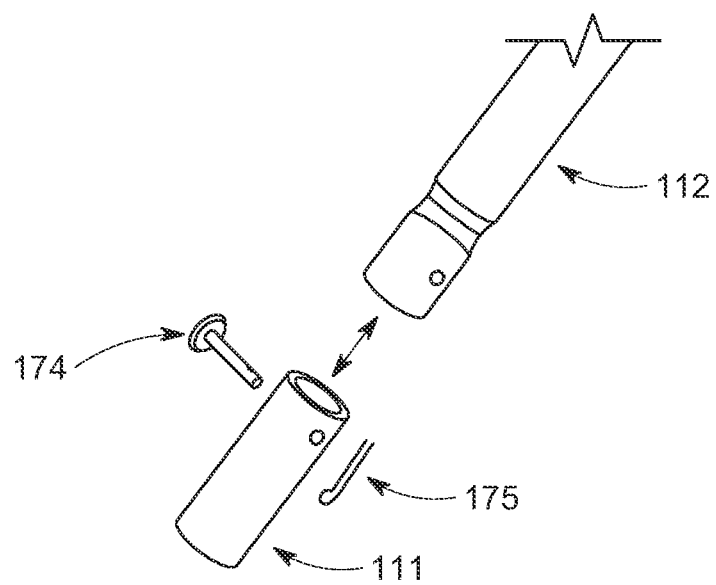

Once upper leg 112 has been secured to screw anchor 111, applying pressure to the top end of upper leg 112 will put strain on the crimped indentation causing it to plastically deform in the direction of the applied force. The length of the upper leg 112 will function as a lever allowing deformation to occur without machine assistance. A jig or other device, such as jig 500 shown and discussed in the context of FIG. 5C may be attached to the free end of adjacent upper legs 112 to enable an installer to determine whether adjustment is needed and if, so which leg and in which direction it should be made. By applying pressure to the top end of one or both upper legs, articulating joint 172 will yield, enabling the installer to plastically deform upper leg 112 to achieve the desired orientation. FIG. 6B shows a close-up of lower end 171 of upper leg 112 including join 172, and FIG. 6C is a partially exploded view of one possible way of connecting screw anchor 111 to upper leg 112. It should be appreciated that these are exemplary only and that other means may be used to physically couple the ends of the two piles together.

Figure 6D:
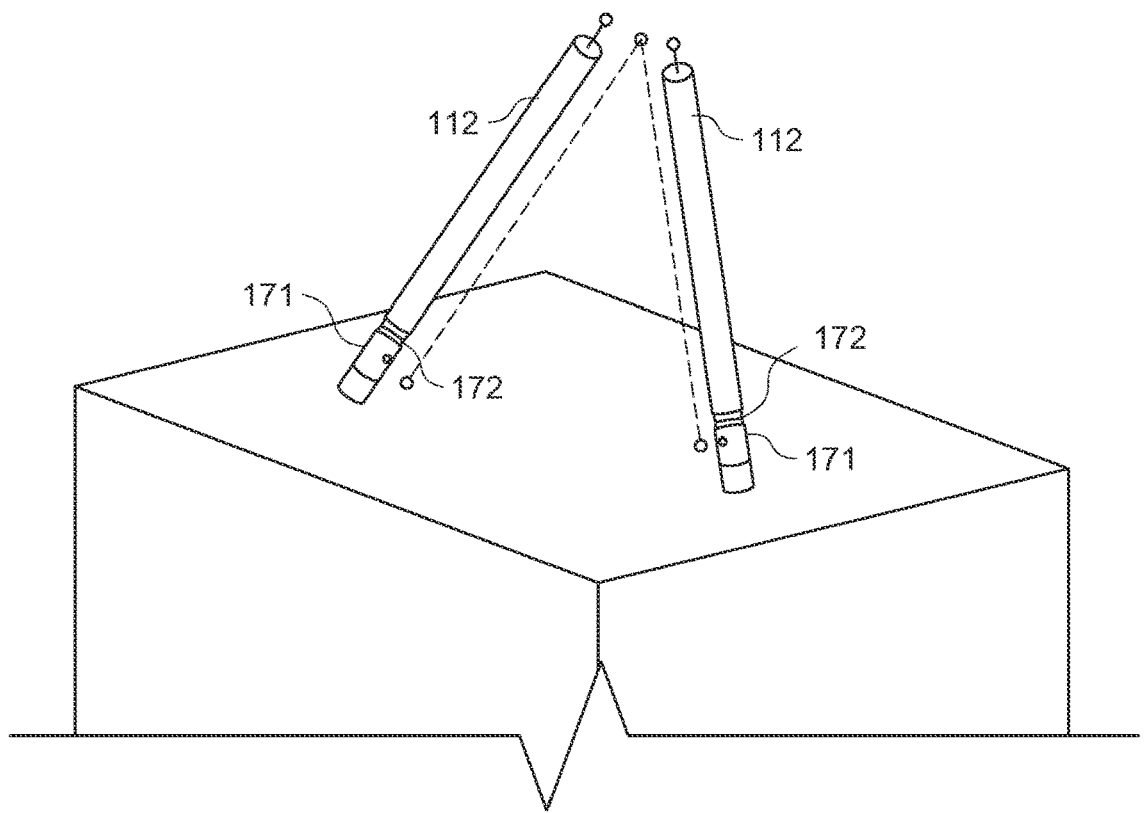
FIGS. 6D and E show possible misalignment cases that can be corrected with the truss leg according to FIGS. 6A-C.
Figure 6E:
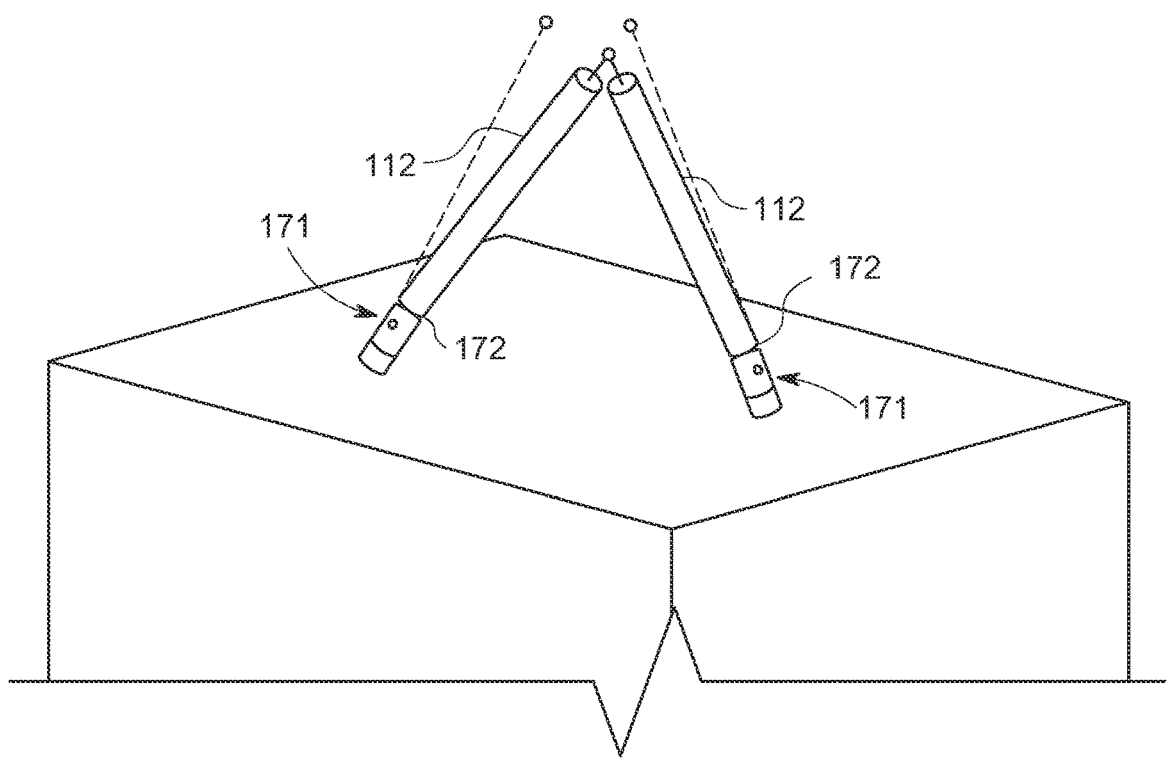
FIG. 6F is corrosion resistant sleeve for use with the truss leg of FIGS. 6A-C.

FIGS. 6D and E show upper leg 112 of FIGS. 6A-C articulating relative to screw anchor 111 to adjust for axial misalignment of the latter with an intended axis of rotation. In 6D, coupling upper leg 112 to screw anchor 111 reveals that the screw anchors are out of plane with one another because their respective axes do not intersect. Pressing on the top end of each upper leg 112 will deform it about articulating joint 172, enabling them to be re-aligned so that their respective axes intersect at the desired work point or rotational axis as seen in 6E. Plastic deformation of articulating joint 172 ensures that the correct orientation of upper legs 112 will be preserved for subsequent attachment of adapters, bearing assemblies and/or bearing adapters.

Figure 6F:
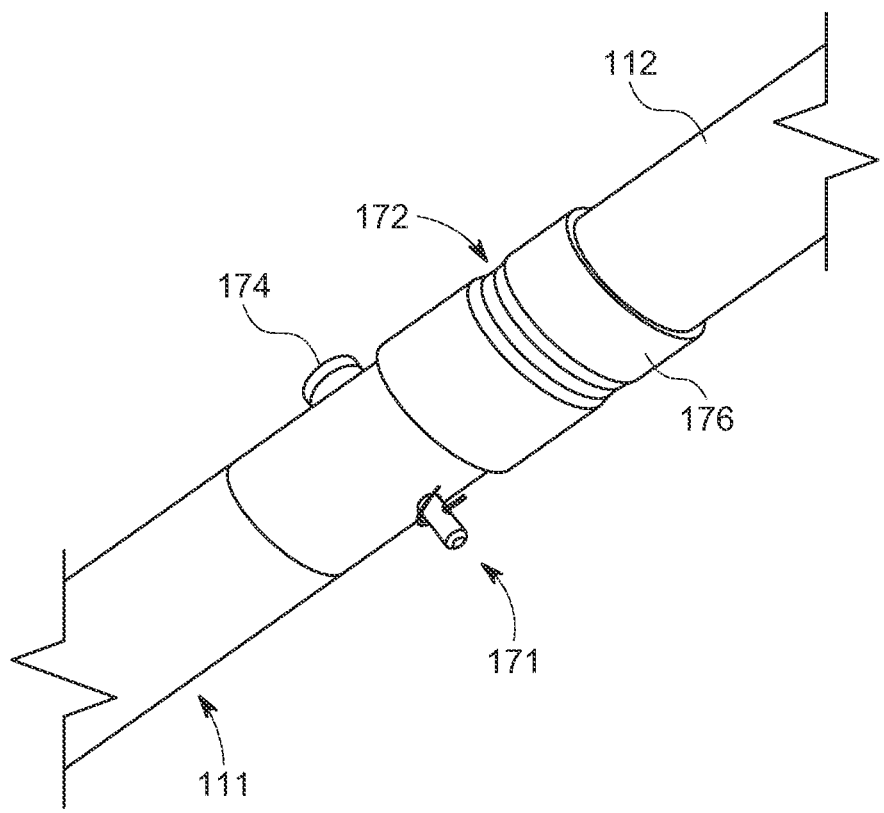

Plastic deformation of joint 172 may have the untended consequence of cracking or otherwise damaging any corrosion resistant surface formed on upper leg 112 if the surface is unable to plastically deform. These surfaces may include, but are not limited to, zinc, epoxy or polymer. If the corrosion resistant coating is less malleable than the underlying steel, plastic deformation of the steel could result in cracks or other failures that expose the base metal. In order to mitigate this risk, in various embodiments, it may be necessary desirable to reinforce joint 172. In the example of FIGS. 6F, this is done with sleeve 176 made of rubber, polymer or other suitable UV-resistant material that extends past either side of joint 172 to provide a water and air-tight seal, protecting an exposed base metal from exposure. In other embodiments, a layer of rubberized paint or other suitable flexible coating may be applied over joint 172 to protect the underlying metal.

Figure 7A:
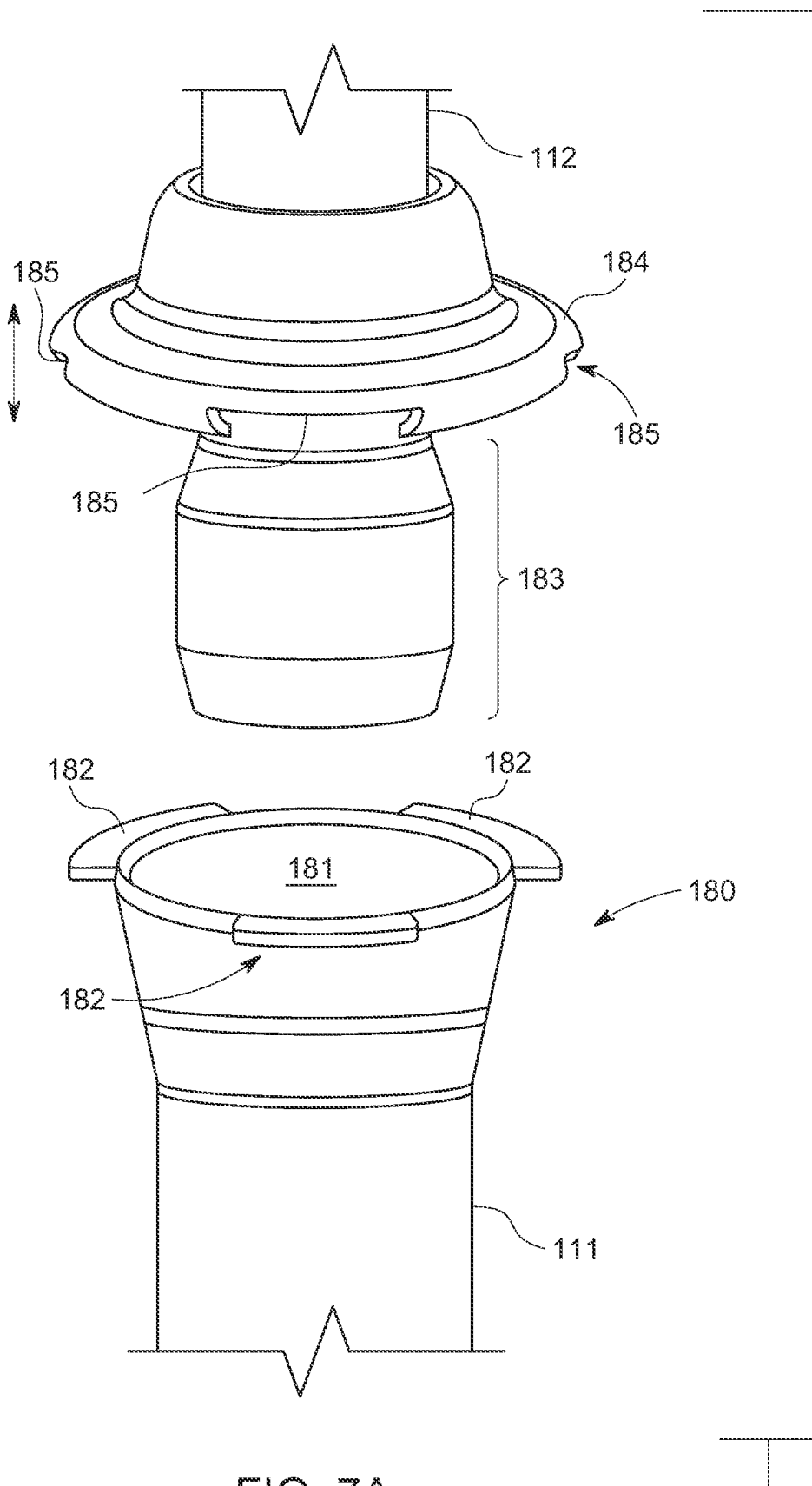
FIGS. 7A-C show incremental steps of assembly of a two-piece truss leg according to various embodiments of the invention.
Figure 7C:
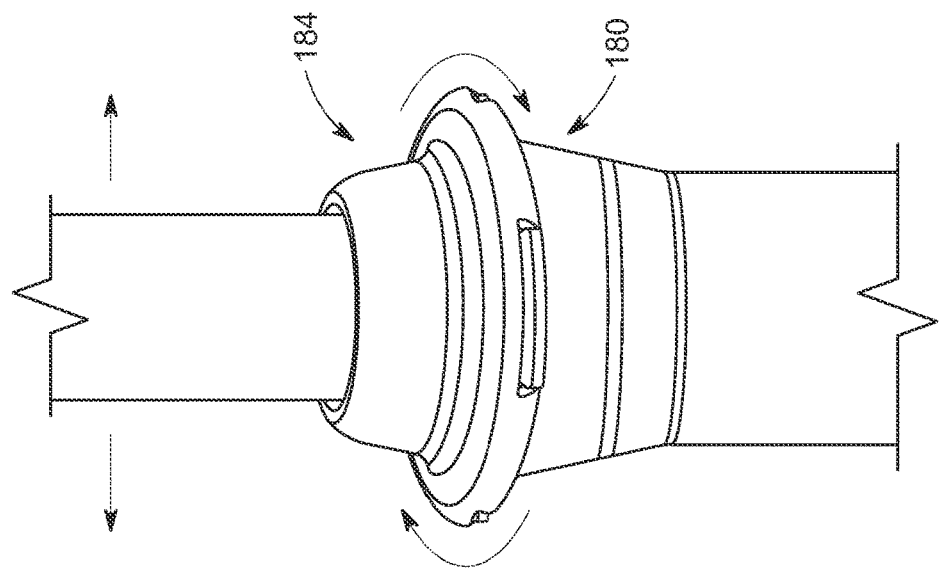
Figure 7B:
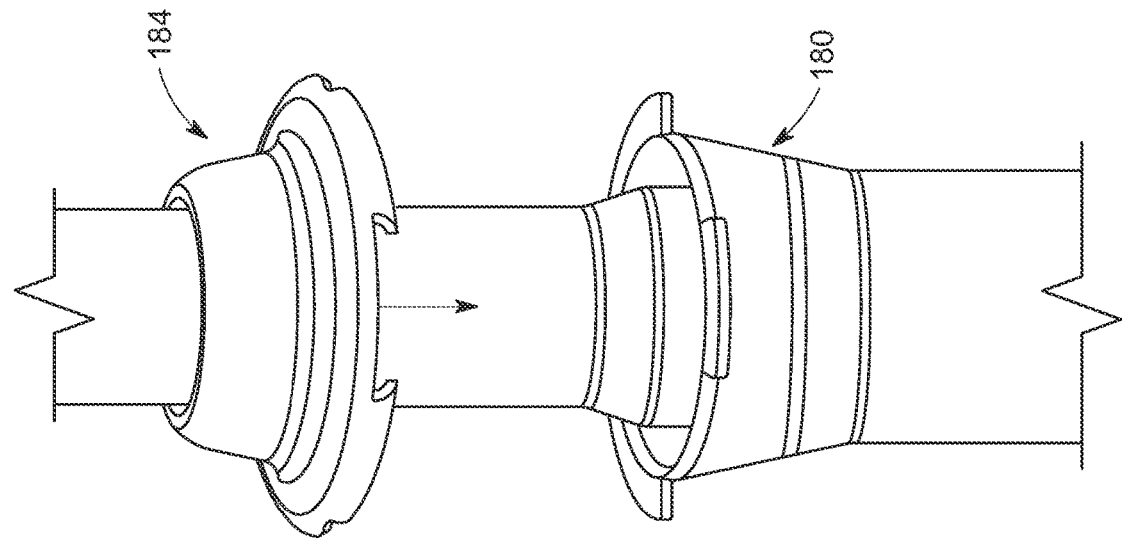

Turning now to FIGS. 7A-C, these figures show a coupling system for a two-piece truss leg according to various other embodiments of the invention. In this system, the ends of screw anchor 111 and upper leg 112 are modified to facilitate coupling and enable axial misalignment. Screw anchor 111 includes bell-shaped end 180 that terminates with flanges 182 spaced around opening 181. Similarly, upper leg 112 has fluted end 183 that consists of opposing tapered portions separated by a section of uniform diameter. The first tapered portion acts as a lead-in to assist with insertion of the end 183 into opening 181 while the uniform diameter portion helps fluted end 183 seat within opening 181. Locking collar 184 is sleeved down over end 183 to engage with flanges 182 on end 180 of screw anchor 111. Locking collar 184 has a center opening large enough to accommodate the outside diameter of upper leg 112 so that it can slide along upper leg 112 without interference. Once fluted end 183 is inserted into opening 181 of screw anchor 111, locking collar 184 is slid down upper leg 112 until flanges 182 of end 180 are oriented into corresponding openings 185 in collar 184. Collar 184 is then rotated less than one quarter turn to lock it to screw anchor 111. Rotating the collar traps fluted opening 183 of upper leg 112 in bell-shaped opening 181 so that it can resist axial forces and yet articulating to different angles with respect to screw anchor 111.

The geometry of the system of FIGS. 7A-C allows upper leg 112 to move within opening 181 like a ball in a ball and socket joint, enabling upper leg 112 to articulate by several degrees (e.g., 0 to 10-degrees) in any direction without deforming either component or disconnecting one from the other. Though not shown in the figure, locking collar 184 may have two or more smooth faces on opposing sides of its outer surface to enable an installer to use a tool to torque it down. In various embodiments, axial adjustments may be made after locking collar 184 has been locked to end 180 of screw anchor 111. In other embodiments, upper leg 112 must first be oriented to the desired angle with respect to screw anchor 111 before locking collar 184 is locked. Contact between fluted end 183 of upper leg 112 in opening 181 may provide enough resistance to hold upper leg in place as it is oriented to the desired angle without the aid of locking collar 184. One advantage of this system over that of FIGS. 6A-C is that collar 184 may be repeatedly locked and unlocked with destroying components or compromising corrosion resistant surfaces because it relies on elastic deformation.

Turning to FIGS. 8A-D, these figures show another coupling system for joining two-piece truss legs for an A-frame foundation according to various other exemplary embodiments of the invention. In this system, base pile 111 has an enlarged, bell-shaped end 190 with stamped features projecting out of its surface that form an inlet and ridges to guide features formed in a locking collar into and out of a locked position. End 190 has two or more inlets 192 and corresponding ridges 191 for guiding indentations 197 formed in locking collar 196 to pull the collar down and lock it in place via recess 193. This captures end 194 of upper leg 112 within bell-shaped end 190 of screw anchor 111. End 194 of upper leg 112 may have a fluted geometry like that shown in the embodiments of the FIGS. 7A-C, with opposing tapered portions separated by a section of uniform diameter. In various embodiments, end 194 of upper leg 112 may have the same shape as end 183 shown in FIG. 7A.

This geometry allows the end 194 of upper leg 112 to fit and articulate within bell-shaped end 190 of screw anchor 111. Then, locking collar 196 can slide down the shaft of upper leg 112 until it reaches upper end 180 of screw anchor 111. Indentations 197 in the outer surface of collar 196, corresponding to projections on the inside surface, slide into inlets 192. A combination of downward pressure and torque allows projections 197 to travel along stamped ridges 191, pulling collar 196 closer to screw anchor 111 until it reaches stop 193 where it locks into place. In various embodiments, this connection resists axial forces of tension and compression while allowing upper leg 112 to be axially misaligned with respect to screw anchor 111 via the ball-and-socket-like interface between them.

Figure 8B:
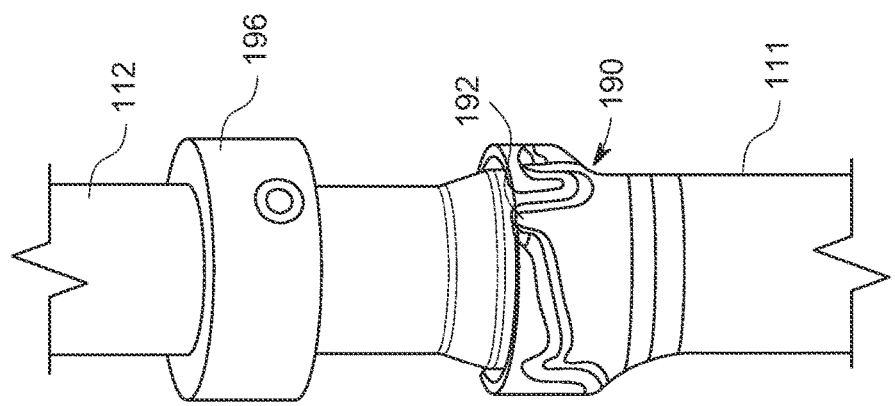
FIGS. 8A-D show incremental steps of assembly of another two-piece truss leg according to various embodiments of the invention.
Figure 8A:
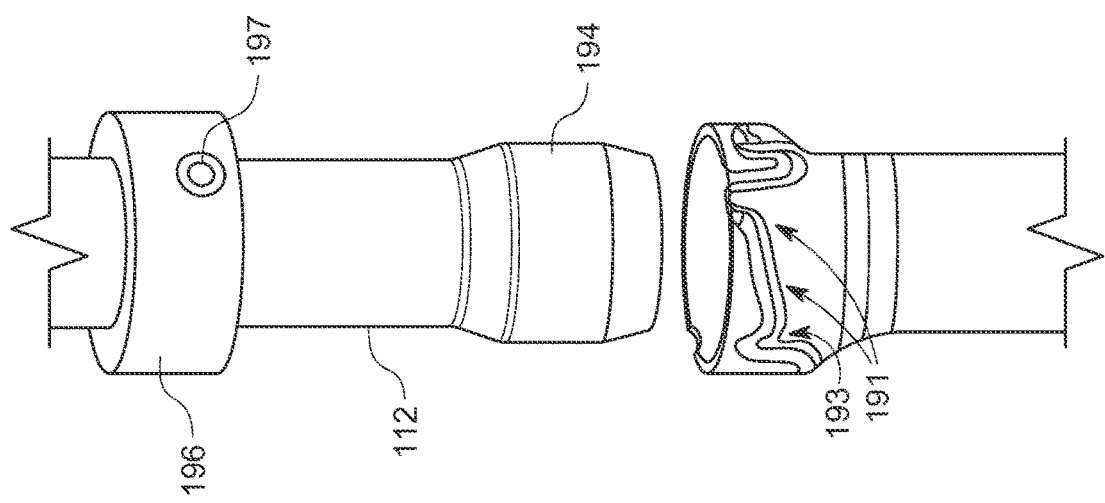
Figure 8D:
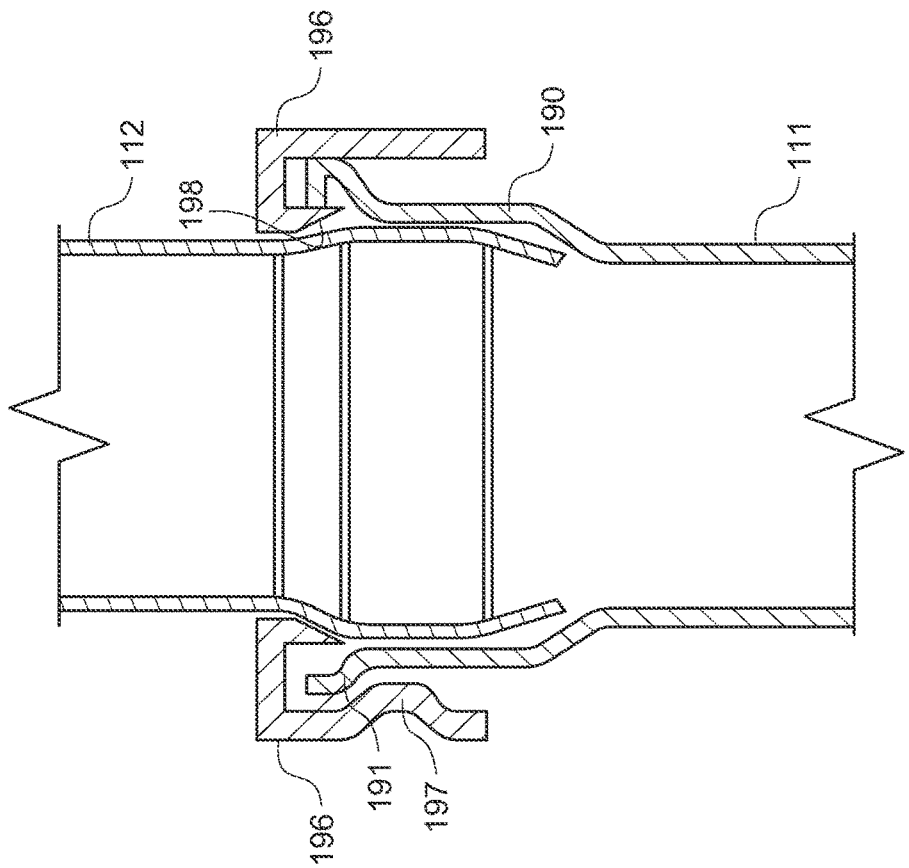
Figure 8C:
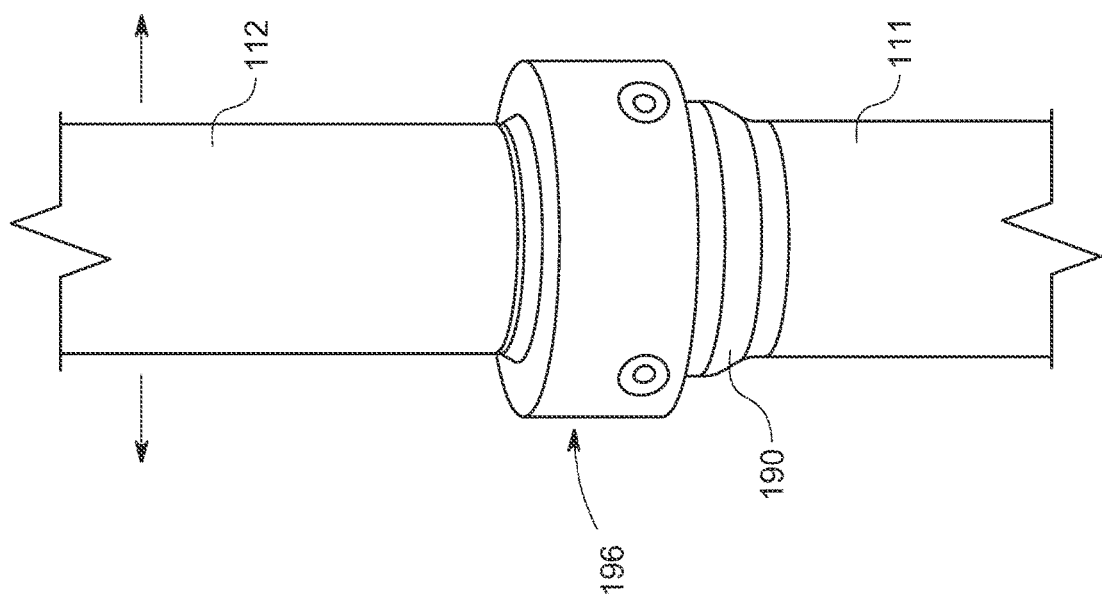

FIG. 8C shows the assembly of FIGS. 8A and B after collar 196 is locked to screw anchor 111 and 8D is a cross-sectional view revealing the geometry of system components. The inside surface of collar 196 extends down (towards the base pile) only part of the distance of the outside face. The inside face has canted edges 198 sloping away from the surface of fluted portion 194 at an angle that approximates the slope of the first taper so that the inside face does not interfere with upper leg 112 when collar 196 is pulled closer to screw anchor 111. Removal of collar 196 is accomplished by the reverse process: pushing down on collar 196 until projections 197 exit their respective stops 193 and clear the deepest part of ridges 191 while rotating it until projections 197 reach their respective outlets 192.

Figure 9A:
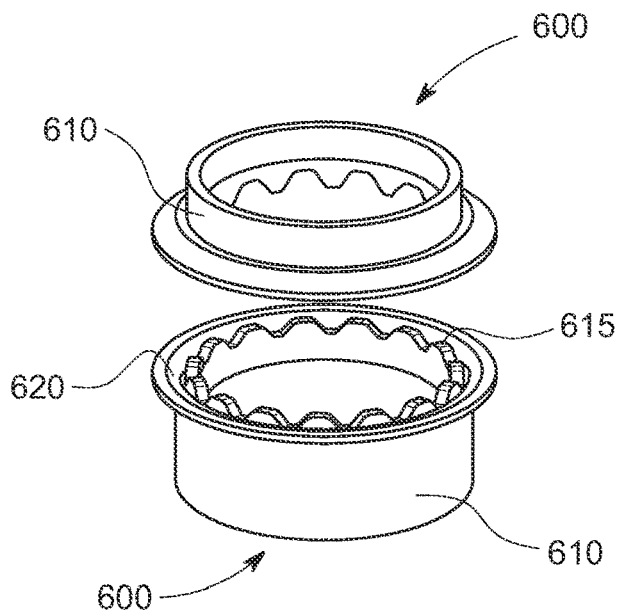
FIGS. 9A-C show incremental steps of assembly of yet another two-piece truss leg according to various embodiments of the invention.
Figure 9B:
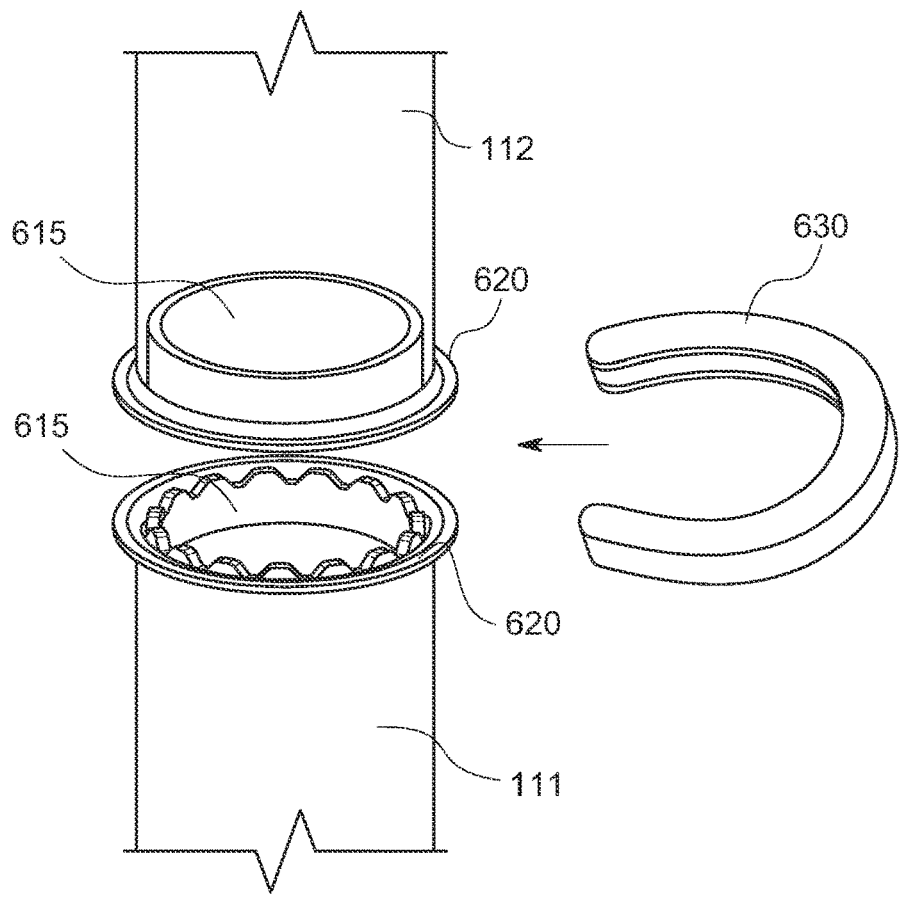
Figure 9C:
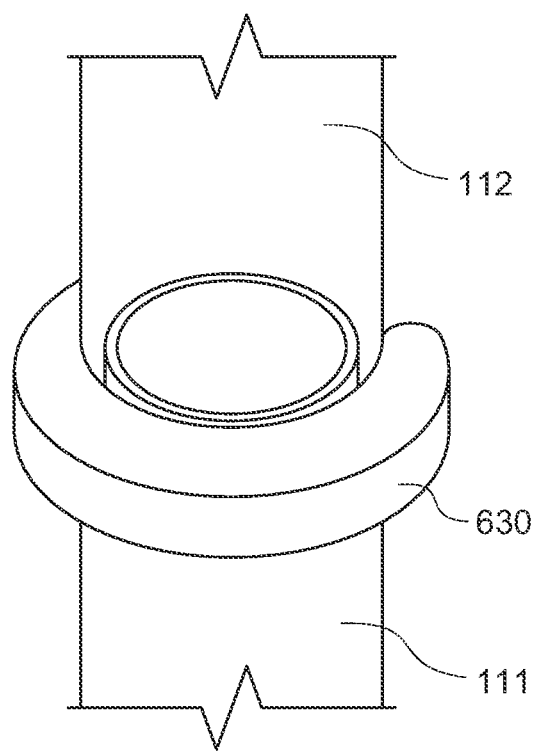

In some cases, once the correct orientation of the two foundation components has been confirmed, it may be desirable to couple an extension member to screw anchor 111 or, in some cases, an extension leg to upper leg 112 without introducing any axial misalignment between the two connected components. To that end, FIGS. 9A-C show a system for joining two foundation components end-to-end without misaligning an axis of one with respect to the other. In other words, this system enables attachment of one foundation component to another to substantially extend the axis of the first component along the same axis.

Rather than modifying or stamping the end of either screw anchor 111 or upper leg 112, each receives insert 600 that consists of body 610, toothed ring 615 and flange 620 surrounding the tooth-shaped ring. In various embodiments, insert 600 may be welded to the top end of the first foundation component and to the corresponding bottom end of the second component to be joined. In various embodiments, they are substantially the same dimensions. Once attached, inserts 600 provide a pair of symmetrical surfaces that allow the two components, in this case, screw anchor 111 and upper leg 112 to be joined end-to-end while preventing them from spinning, rotating or articulating with respect to each other. In various embodiments, when properly oriented, tooth-shaped rings 615 will fit together without any voids. When this happens, respective opposing flanges 620 of the upper and lower inserts will contact one another in a geometry that minimizes spacing between the flanges 620. In various embodiments, semi-circular snap ring 630 is press fit over flanges 620 from the side, locking them together into a substantially unitary structure.

An additional benefit provided by toothed rings 615 is that the fitment between the teeth of the upper and lower inserts enables torque applied to one foundation component to be transferred to the other component. In various embodiments, snap ring 630 elastically deforms under the force of a tool or other device as it is pressed over adjacent flanges 620 so that it may be attached and detached multiple times with a set of snap ring pliers or other equivalent device.

It should be appreciated that the embodiments described and claimed herein are exemplary only. Those of ordinary skill in the art will appreciate modifications and substitutions that retain the spirit and scope of the invention.

The invention claimed is:

1. A coupler for joining foundation members comprising:
    a main body portion;
    a set of driving features circumscribing at least a portion of the main body portion;
    a first connecting portion, extending away from the set of driving features in a first direction, the first connecting portion comprising a projection having an outer surface with a progressively changing diameter with at least one channel bisecting the outer surface; and
    a second connecting portion, extending away from the set of driving features in a second direction, opposite to the first direction.

2. The coupler according to claim 1, wherein the second connecting portion comprises a recess for receiving an open end of a first foundation member.

3. The coupler according to claim 1, wherein the outer surface progressively changes diameter in the first direction and the at least one channel is orthogonal to the first direction.

4. The coupler according to claim 1, wherein the set of driving features are located at a base of the first connecting portion, limiting a depth of penetration of the first connecting portion into an open end of a second elongated foundation member.

5. The coupler according to claim 4, wherein the set of driving features and outer surface enable the second elongated foundation member to pivot through a range of angles about the set of driving features.

6. A multi-piece leg system for a truss foundation comprising:
    a first elongated foundation component;
    a coupler located at one end of the first elongated foundation component; and
    a second elongated foundation component, wherein the coupler comprises a set of driving features and a connecting portion extending away from the set of driving features in a first direction that has an outer surface with a progressively changing diameter that is received within one end of the second elongated foundation component.

7. The system according to claim 6, wherein the connecting portion comprises at least one channel bisecting the outer surface orthogonal to the first direction.

8. The system according to claim 7, further comprising a crimp connection deforming the second elongated foundation component into the at least one channel thereby fixing the second elongated foundation component to the first elongated foundation component.

9. The system according to claim 6, wherein the coupler further comprises a recess extending in a second direction, opposite to the first direction, and the first elongated foundation component is received in the recess.

10. A truss foundation comprising:
    a pair of first elongated foundation members;
    a driving coupler located at one end of each of elongated foundation members of the pair of first elongated foundation members the coupler having a main body portion, a set of driving features circumscribing at least a portion of the main body portion, and a first connecting portion with an outer surface with a progressively changing diameter and at least one channel bisecting the outer surface;
    a pair of second elongated foundation members, wherein each one of the pair of second elongated foundation members is attached to one of the first elongated foundation members at a first end via one of the driving couplers; and
    a truss adapter joining respective second ends of the pair of second elongated foundation members to form a unitary truss foundation.

11. The truss foundation according to claim 10, wherein each driving coupler further comprises:
    a second connecting portion, extending away from the set of driving features in a second direction, opposite to the first direction.

12. The truss foundation according to claim 11, wherein the second connecting portion comprises a recess for receiving an open end of one of the first elongated foundation members.

13. The truss foundation according to claim 11, wherein the outer surface progressively changes diameter in the first direction and the at least one channel is orthogonal to the first direction.

14. The truss foundation according to claim 11, wherein the set of driving features are located at a base of the first connecting portion, limiting a depth of penetration of the first connecting portion into an open end of the second elongated foundation member.

15. The truss foundation according to claim 14, wherein the set of driving features and outer surface enable the second elongated foundation member to pivot through a range of angles about the set of driving features.

16. The truss foundation according to claim 10, wherein the pair of second elongated foundation members are secured to respective ones of the driving couplers via crimped connections.

* * * * *